June 19, 1962
C. P. KOLTHOFF, JR
3,039,737
DEVICE FOR CONTROLLING CLEARANCE BETWEEN
ROTOR AND SHROUD OF A TURBINE
Filed April 13, 1959
3 Sheets-Sheet 1
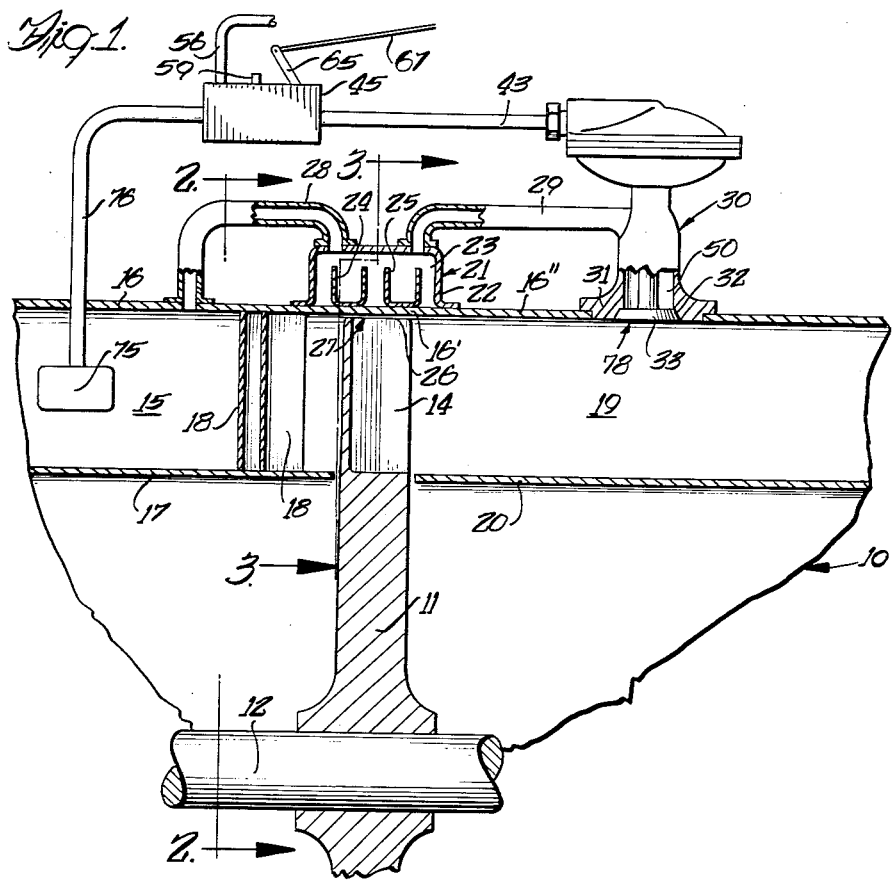
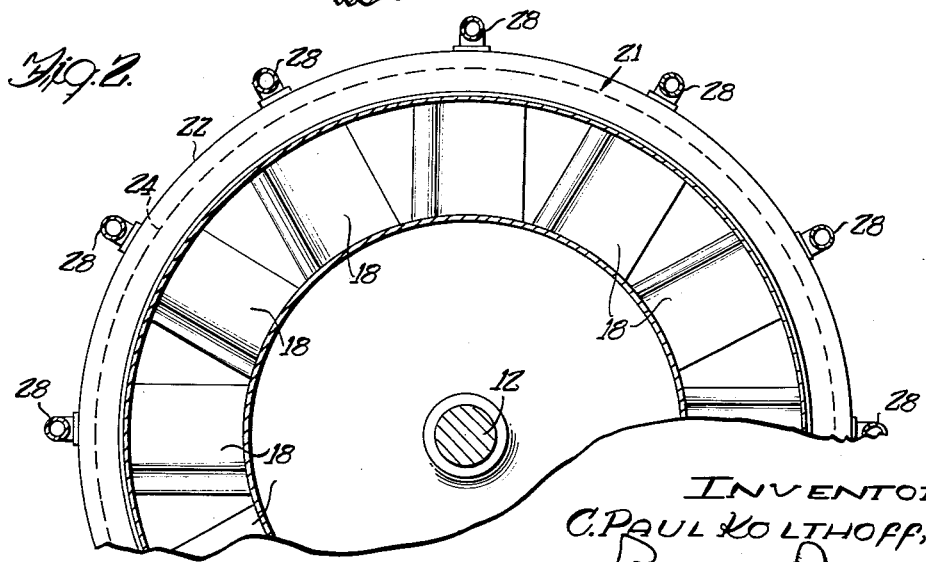
INVENTOR
C. PAUL KOLTHOFF, JR.
ATTORNEY June 19, 1962

C. P. KOLTHOFF, JR 3,039,737

DEVICE FOR CONTROLLING CLEARANCE BETWEEN
ROTOR AND SHROUD OF A TURBINE

Filed April 13, 1959

INVENTOR
C. PAUL KOLTHOFF, JR.

Paul O. Pippel

ATTORNEY

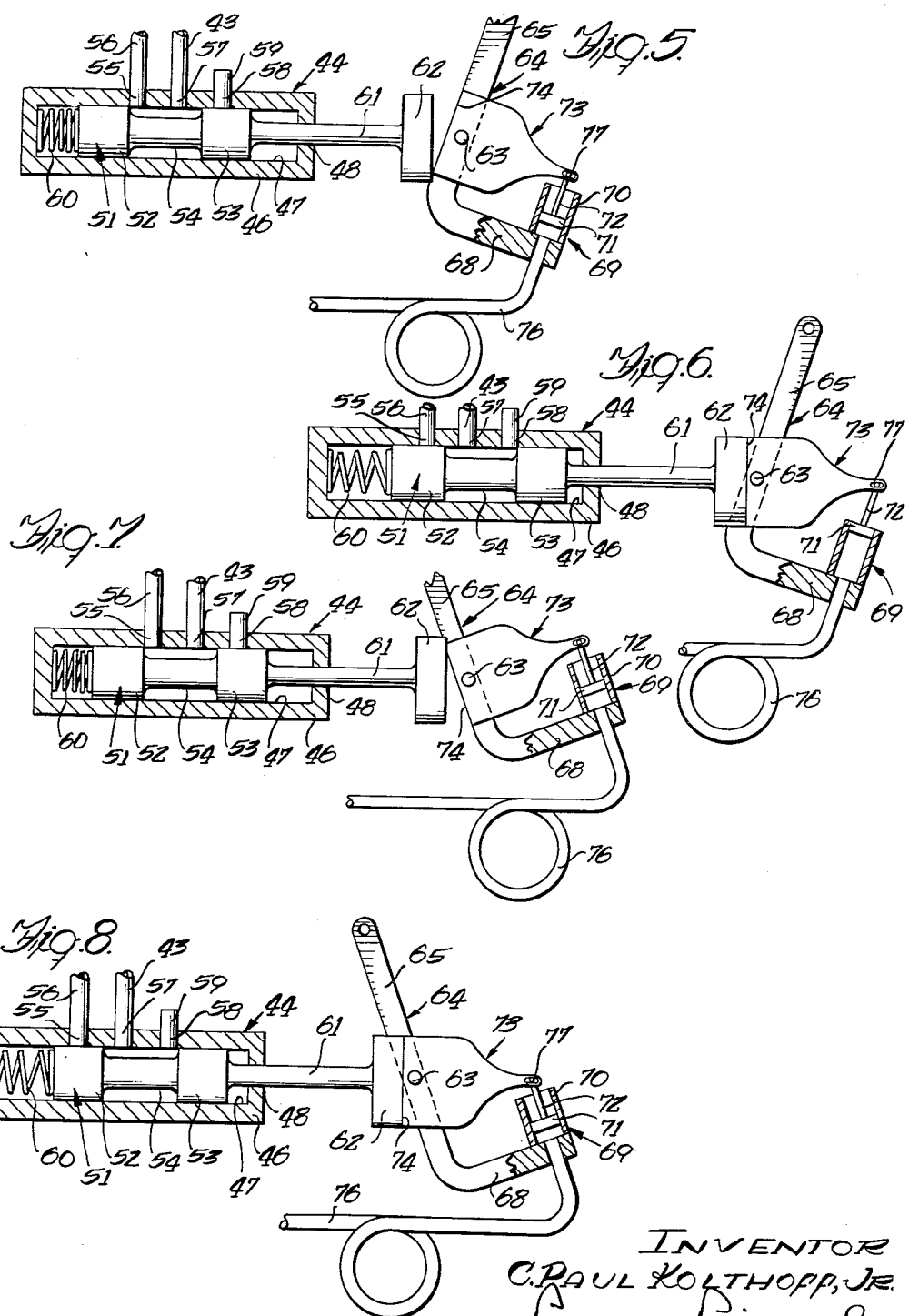

United States Patent Office 3,039,737
Patented June 19, 1962

3,039,737
DEVICE FOR CONTROLLING CLEARANCE BETWEEN ROTOR AND SHROUD OF A TURBINE
C. Paul Kolthoff, Jr., Naperville, Ill., assignor to International Harvester Company, Chicago, Ill., a corporation of New Jersey
Filed Apr. 13, 1959, Ser. No. 805,839
10 Claims. (Cl. 253—39.1)

This invention relates to a means for controlling the clearance between the rotor and shroud of a heated gas propelled turbine. More in particular this invention relates to a device for thermally varying the internal diameter of a turbine shroud to compensate for thermally induced changes in the diameter of the turbine rotor.

In the construction of a turbine of the type propelled by heated gas under pressure, one of the factors which is highly influential in the efficiency of the engine relates to the spatial clearance between the outer radial extremities of the rotor with respect to the internal diameter of the shroud peripherally disposed about the rotor. If the spatial clearance between these two members is high then much heated propelling gas from the turbine's intake chamber is conducted through the spatial clearance to the exhaust chamber without performing work on the rotor. If the clearance is too small the outer extremities may physically engage or scrape against the shroud thereby damaging the rotor. This particular situation is most likely to occur when the turbine is throttled upwardly which correspondingly increases the temperature and pressure of the heated propelling gas delivered to the turbine's intake chamber. The increase in temperature of the propelling gas almost immediately elevates the temperature of the rotor due to the large surface contact area resulting in a thermally induced radial expansion of the rotor. The temperature of the shroud however does not increase as rapidly as that of the rotor. From this it is apparent that damage will occur to the rotor if the spatial clearance between the rotor and shroud is too small. If damage to the rotor does not occur then the spatial clearance must be greater than that necessary according to this invention.

On the other hand if the engine is throttled downwardly then the efficiency of the engine is temporarily lowered to below normal level because the shroud cools at a lower rate than the rotor resulting in an abnormal high spatial clearance until such time as the shroud's temperature decreases to correspond with the temperature of the rotor.

It is the prime object of this invention to provide a means for minimizing or eliminating the lag in the rate of change in temperature of a turbine shroud with respect to the corresponding rate of change in temperature of the turbine's rotor.

A further important object of this invention is to provide in a turbine a means for thermally varying the internal diameter of the shroud to compensate for thermally induced changes in the diameter of the rotor.

A still further object of this invention is to provide in a turbine means for minimizing the spatial clearance between the rotor and shroud under constant load conditions.

A yet further object of this invention is to provide in a turbine means for minimizing the spatial clearance between the rotor and shroud under variable load conditions.

Another important object of this invention is to provide means in a turbine for increasing the efficiency thereof by reducing the spatial clearance between the rotor and shroud members irrespective of operating load conditions.

These and other important and desirable objects inherent in and encompassed by the invention will become more readily understood from the ensuing description, the appended claims and the annexed drawings wherein:

FIGURE 1 is a side elevation, partly in section and partly broken away illustrating the general arrangement of the invention on a turbine.

FIGURE 2 is an end elevation, partly in section and partly broken away, taken on line 2—2 of FIGURE 1 illustrating the turbine's deflectors and shroud including a portion of conduit means leading into an annular passage of the shroud.

FIGURE 5 illustrates the relative position of the control valve and cam immediately after the throttle control lever has been moved from the position shown in FIGURE 4 in a direction to increase the speed of the turbine.

FIGURE 6 is the same as FIGURE 5 except that the thermally responsive element has actuated the cam to return the control valve to the position shown in FIGURE 4.

FIGURE 7 illustrates the relative position of the control valve and cam immediately after the throttle control lever has been moved from the position shown in FIGURE 4 in a direction to decrease the speed of the turbine.

FIGURE 8 is the same as FIGURE 7 except that the thermally responsive element has actuated the cam to return the control valve to the position shown in FIGURE 4.

Figure 3:
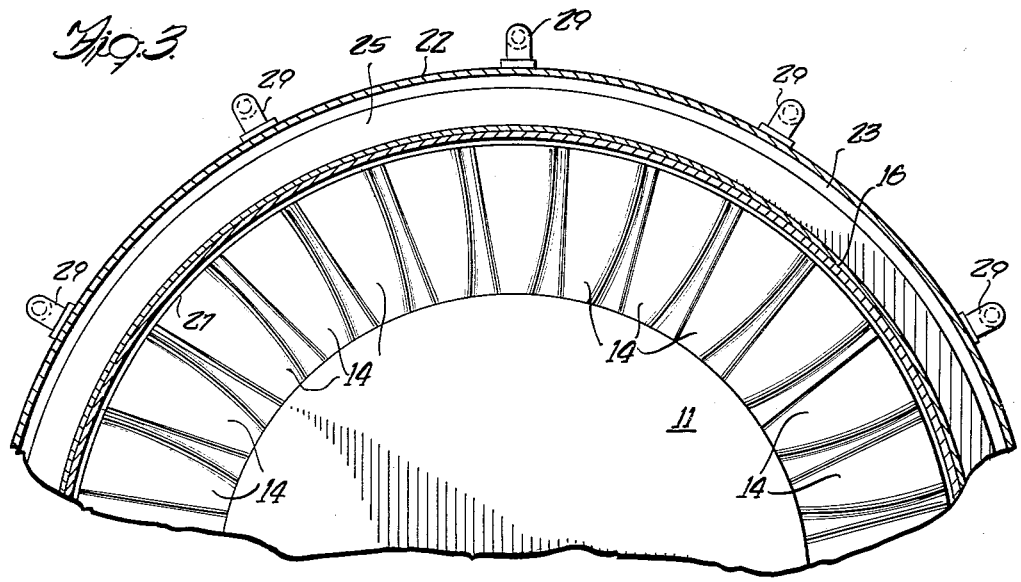
FIGURE 3 is an end elevation, partly in section and partly broken away, taken on line 3—3 of FIGURE 1 showing the vanes of the rotor and internal construction of the shroud and its annular passage.

With continued reference to the drawings the numeral 10 indicates generally a turbine. At this point it will be understood that all parts and portions of the turbine not shown in the drawings may be assumed to be consistent with conventionally known turbine engines. The turbine 10 is provided with a rotor 11 rotatable on the shaft 12 supported by the usual bearings (not shown).

The rotor 11 is provided with the usual impeller blades 14 (FIGURES 1 and 3) disposed about the peripheral portion thereof in a generally radial arrangement.

The turbine 10 is provided with the usual intake chamber 15 formed by the walls 16 and 17 and connected communicatively to a source of heated gas under pressure (not shown). The chamber 15 is provided with stationery deflectors 18 spaced axially in alinement with the impeller blades 14 of the rotor 11 as illustrated in FIGURES 1 and 2. The deflectors 18 are positioned to alter the direction of flow of hot gas under pressure to impinge the impeller blades 14 of the rotor 11 at an advantageous angle whereby maximum work of the moving gas is imparted to the rotor 11.

The turbine 10 is also provided with the usual exhaust chamber 19 formed by the walls 16" and 20. For convenience the wall 16" may be a continuation of the walls 16 and 16' as illustrated in FIGURE 1 or it may be a separate wall itsef. The exhaust chamber 19 serves the purpose of receiving and discharging hot gas after the gas has performed work on the rotor. The discharge of the hot gases from the exhaust chamber 19 may be in accordance with conventional practice.

Peripherally disposed adjacent the outer periphery of the rotor 11 is a shroud generally indicated at 21 of FIGURE 1. The shroud 21 is formed by an annular shaped channel member 22 and the wall 16'. For convenience the wall 16' may be integral with the walls 16 and 16'' or it may be a separate wall as may be desired. The channel member 22 is secured in gas-tight relation with respect to the wall 16'. Thus the shroud 21 is provided with a toroidal shaped external jacket having an annular shaped passage designated at 23.

For purposes of providing better rigidity or stability of the wall 16' and also to facilitate improved heat transfer from the annular passage 23 to or from the shroud wall 16', there may be provided a pair of annular shaped channel elements 24 and 25 secured, preferably by welding, to the outer surface of the shroud wall 16' as best shown in FIGURE 1.

At this point it will be observed from FIGURE 1 that a small spatial clearance between the outer extremity 26 of the rotor 11 and the internal side of the shroud wall 16' of the shroud 21, the spatial clearance being indicated at 27. In other words the spatial clearance between the internal surface of the shroud and outer extremity of the rotor is the difference between the radial distance from the axis of the shaft 12 to the inner surface of the wall 16' and the radial distance from the axis of the shaft 12 to the outer extremity of the rotor. As previously indicated it is the objective of this invention to minimize the magnitude of the spatial clearance 27 and to maintain this spatial clearance at a substantially constant value for all operating conditions of the engine thereby improving the efficiency of the turbine without danger of damage to the rotor.

From FIGURE 1 it will be seen that a conduit 28 communicatively connects the annular passage 23 of the shroud 21 to the intake chamber 15. Also leading from the annular passage 23 of the shroud 21 is a conduit 29 communicatively connected with the inlet port 49 (FIGURE 4) of a pressure sensitive valve generally indicated at 30. At this point it will be seen from FIGURES 2 and 3 that plurality of conduits 28 and 29 are shown spaced equidistantly around the shroud 21. Theoretically a single conduit 28 and a single conduit 29 is all that is necessary to function according to the invention. However, a plurality of conduits 28 as shown in FIGURE 2 with a single conduit 29 is preferable. Such construction permits heated gas from the intake chamber 15 to enter the annular passage 23 of the shroud 21 for a more uniform temperature change throughout the shroud and a single conduit 29 necessitates but one pressure sensitive valve 30 with an outlet port 50 for the discharge of the gas in the annular passage 23. Of course in either construction the total capacity or size of the conduit 29 should be equivalent to that of conduit 28 as is commonly known by those skilled in the art of conducting fluids.

Figure 4:
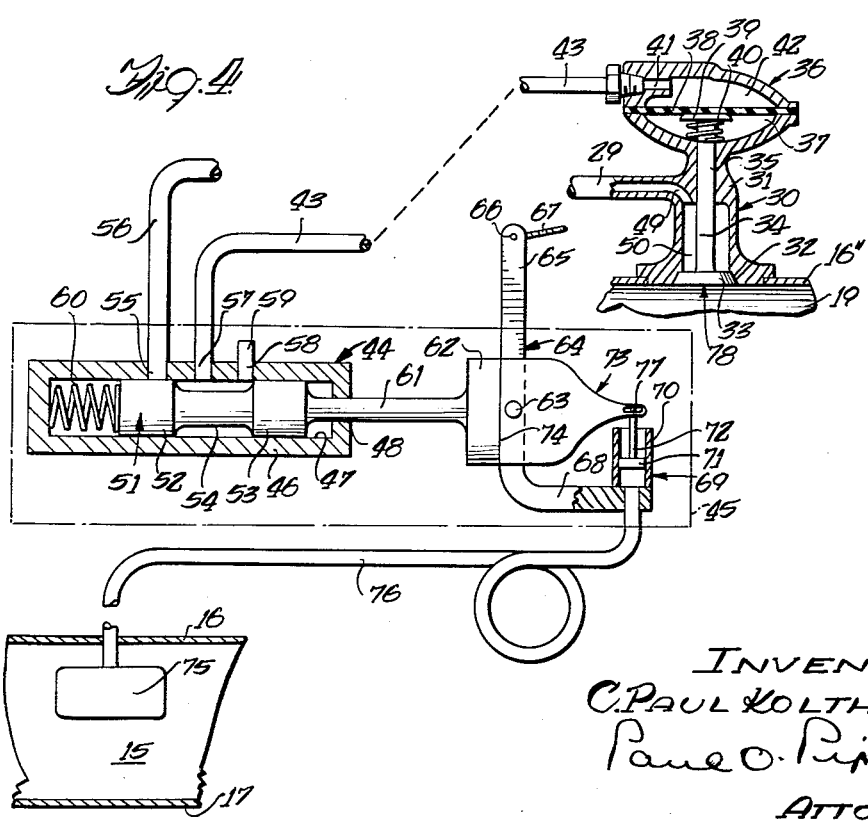
FIGURE 4 is a schematic view of the components of one embodiment of the invention in relation to each other illustrating, in section, the position of the valve means, cam, throttle control lever, and the thermally responsive element for actuating the valve means under normal operating conditions.

The fluid pressure sensitive valve or fluid pressure operated valve 30 may be of conventional construction. The construction of the valve 30 illustrated in FIGURE 4 is of the poppet type having a housing 31 provided with a valve seat 32. The valve head 33 fits in seating relation with the seat 32 to prevent flow of fluid thereby when the valve is in closed position. Integrally connected to the valve head 33 is a valve stem 34 slidably fit into a bore 35 in the housing 31. The valve may be provided with a valve actuating mechanism generally indicated at 36 comprising a closed chamber 37 formed by the housing 31 and a flexible diaphragm 38. The upper end of the valve stem 34 is provided with a cap 39 bearing on the under side of the diaphragm 38. A compressive or captive spring 40 is positioned against the housing 31 and cap 39 thus urging the valve 30 toward a normally closed position. A port 41 is provided to communicate an upper chamber 42 formed by the housing 31 and the diaphragm 38 with pipe 43. Thus by introducing fluid under pressure through the pipe 43 into the upper chamber 42 urges deflection of the diaphragm 38 in a downward direction overcoming the spring 40 thereby moving the valve stem 34 downwardly to unseat the valve head 33 to open the valve 30 for by-passing heated gas from the intake chamber 15 through the shroud 21 into the exhaust chamber 19.

Now in order to actuate the pressure sensitive valve 30 there is provided a control valve generally indicated at 44 which may conveniently be enclosed in a container or box 45. The control valve 44 may be comprised of a casing 46 having a centrally located large bore 47 and a small bore 48 at one end in axial alinement as shown in FIGURE 4. Within the bore 47 in slidable relation is an operating plunger generally indicated at 51. The plunger 51 is provided with a pair of longitudinally spaced lands 52 and 53 and a circumferential groove 54 therebetween. The casing 46 is provided with a port 55 positioned in registerable relation alternately with land 52 and groove 54 of the plunger 51 and communicatively connected to pipe 56 leading from a source of fluid under pressure (not shown). The casing 46 is also provided with port 57 in registry with the groove 54 of the plunger 51 and communicatively connected to pipe 43. A discharge port 58 in the housing 46 is positioned in registerable relation alternately with land 53 and groove 54 of the plunger 51 and communicatively connected to pipe 59 which pipe 59 forms part of the fluid return means of the said source of fluid under pressure. Of course if the fluid under pressure is in the form of compressed air the pipe 59 is merely open to the atmosphere as the atmosphere itself serves as a return means for the source of compressed air.

From the above it will be seen that the control valve 44 has two operating positions. The first operating position is illustrated in FIGURES 5 and 7 wherein the ports 55 and 57 are in communication with the groove 54 which communicates fluid under pressure from the pipe 56 to the upper chamber 42 of the valve 30 thus energizing the actuating mechanism 36 to open the valve 30. It will be noted that when the control valve 44 is in the first operating position the discharge port 58 is closed by registration with the land 53 of the plunger 51. The second operating position of the control valve 44 is illustrated in FIGURES 4, 6 and 8 wherein the source of fluid pressure at the port 55 is closed by registration with the land 52 of the plunger 51. At the same time the port 57 is communicatively connected to the discharge port 58 by registration with the groove 54 thereby de-energizing the actuating mechanism 36 for closing the valve 30. The closing of the valve 30 terminates by-pass of gas from the intake chamber 15 through the annular passage of shroud 21 to the exhaust chamber 19.

The plunger 51 is normally maintained in the above referred to second operating position by the urging of compression spring 60 positioned between the plunger 51 and the rearward end of the casing 46.

In order to shift the operating plunger 51 of the control valve 44 from one operating position to the other operating position, the plunger 51 is provided with an integrally connected rod 61 positioned in slidable relation with the small bore 48 in the casing 46. The outer end of the rod 61 is provided with a flange portion which serves as a cam follower 62 for a purpose to be described.

Adjacent the control valve 44 is pivotally mounted at 63 a control arm generally indicated at 64. The pivotal point 63 is preferably positioned in axial alinement with the plunger 51 of the control valve 44. The upper portion 65 of the control arm 64 is pivotally connected at 66 to the throttle control lever partly shown at 67. The throttle control lever 67 is connected to a conventional means for regulating the source of heated gas delivered to the intake chamber such as may be accomplished by regulating the fuel supply. Alternatively the control lever 67 may be operatively connected at a point in the control system which is compensated for ambient temperature, fuel properties, and variables other than fuel flow that influence the temperature in chamber 15.

The lower end portion of the control arm 64 may be provided with a leg 68. At the outer end of the leg is mounted a small fluid actuated cylinder generally indicated at 69. The fluid cylinder is provided with the usual block 70 having a slidable piston 71 therein and a work member 72 attached to the piston 71.

Pivoted at 63 independently of the control arm 64 is a cam element generally indicated at 73. On one side of the pivot 63 the cam element is provided with a cam actuator face 74. On the other side of the cam element 73 is a projection pivotally connected at 77 to the external end of the work member 72 of the fluid cylinder 69.

Within the intake chamber 15 in direct contact with the heated gas under pressure therein is positioned a fluid containing thermally responsive element 75. The element 75 may be in the form of an ordinary bulb having fluid confined therein which is the preferred type because, due to its mass, its reaction arising from a temperature change is progressive with respect to time. In other words, thermal elements of this type do not respond instantaneously to a change in temperature, but instead respond over an elapse of an appreciable period of time. The element 75 is communicatively connected for fluid flow with the fluid cylinder 69 by a flexible or resilient conduit 76 shown in FIGURE 4. From this it can be seen that when the fluid containing thermally responsive element or bulb 75 is heated, the fluid within expands resulting in an increased fluid pressure in the fluid cylinder 69 whereby the piston 71 and work member 72 thereof moves upwardly to rotate the cam element 73 about the pivot 63 in a counterclockwise direction. The rotative movement of the cam element 73 in turn moves the rod 61 to shift the control valve 44 in a direction from the second operating position to the first operating position. Conversely if the temperature of the heated gas in the intake chamber decreases the fluid in the bulb contracts which in turn draws the piston 71 and work member 72 of the fluid cylinder 69 downwardly whereby the cam element 73 is rotated about the pivot 63 in a clockwise direction. The rotative movement of the cam element 73 in turn moves the rod 61 to shift the control valve 44 in a direction from the second operating position to the first operating position as before.

While the fluid containing thermally responsive element 75 is shown to be within the intake chamber 15 it is obvious that it could also be positioned in the exhaust chamber 19 as well because the temperature difference between the two chambers is relative or proportional.

Also it should be obvious that instead of by-passing heated gas from the intake chamber 15 through the annular passage of shroud 21 and into the exhaust chamber 19 as illustrated in the drawings, the conduit 28 (or conduits 28) may instead be communicatively connected to the exhaust chamber 19 and the outlet 78 of the valve 30 be in communication with the atmosphere.

*Operation*

Assuming that the turbine is operating under normal load at a moderate speed the position of the throttle control lever 67 and the control arm will approximate the illustration in FIGURE 4. In this condition it will be seen that the piston 71 of the fluid cylinder 69 is approximately in mid-stroke position thereby maintaining the cam element 73 to permit the control valve 44 to assume its second operating position. It will be seen that when the control valve 44 is in the second operating position the actuating mechanism 36 of the pressure sensitive valve 30 is de-energized because the upper chamber 42 thereof is communicatively connected with the pipe or fluid return means 59 through the control valve 44. Thus the pressure sensitive valve 30 is closed thereby preventing by-pass of heated gas from the intake chamber 15 through the annular passage 23 of the shroud 21 to the exhaust chamber 19. Under such operating conditions the temperature of the shroud 21 will be approximately the same as that of the rotor 11 because of normalizing by heat conduction.

Now suppose the load on the turbine is increased or that it is desired to increase its speed. The throttle control lever 67 is moved in a rightward direction to increase fuel delivery in a conventional manner which in turn elevates the temperature and pressure of the heated gas in the intake chamber 15. This rightward movement of the throttle control lever 67 simultaneously moves the control arm 64 to a position approximately that illustrated in FIGURE 5. The clockwise movement of the control arm 64 about its pivot 63 also moves correspondingly the cam element 73 because the fluid in the cylinder 69 prevents downward movement of the piston 71 thereof. The cam follower 62 is thus moved leftwardly by the action of the cam face 74 of the cam element 73, as illustrated in FIGURE 5. The leftward movement of the cam follower 62 in turn shifts the operating plunger 51 of the control valve 44 leftwardly from the second operating position to the first operating position. The land 53 of the plunger 51 closes the outlet or return means 59 and communicates the source of fluid pressure in the pipe 56 to the upper chamber 42 of the actuating mechanism 36 through the control valve 44, pipe 43 and port 41 thus energizing the mechanism 36 to open the valve 30. The opening of the valve 30 permits by-passing a portion of the heated gas from the intake chamber 15 through the annular passage 23 (FIGURE 1) of the shroud 21 into the exhaust chamber 19. The by-passing of the heated gas immediately acts to elevate at once the temperature of the shroud 21 correspondingly. This increase in temperature of the shroud 21 expands the channel elements 24 and 25 to deflect the wall 16' outwardly which increases the inner diameter thereof. Since the increase in temperature of the rotor 11 correspondingly increases its diameter, the spatial clearance 27 between the rotor 11 and the internal face of the wall 16' remains substantially the same.

Now at the same time the increased temperature of the heated gas in the intake chamber 15 acts on the fluid containing thermally responsive element 75 to expand progressively during an appreciable time period the fluid cylinder 69 which in turn rotates the cam element 73 in a counter-clockwise direction slowly to a position illustrated in FIGURE 6. The movement of the cam element 73 returns the control valve 44 to the second operating position illustrated in FIGURES 4 and 6 thereby de-energizing the mechanism 36 to close the valve 30. The closing of the valve 30 terminates the by-pass of heated gas from the intake chamber 15 through the shroud 21 to the exhaust chamber 19 as previously explained. The delayed response of the thermal element 75 thus permits gas from the intake chamber 15 to flow through the annular passage 23 of the shroud 21 for elevating the temperature thereof consistent with the elevated temperature in the intake chamber 15. Thus, the shroud 21 rapidly expands to meet the changed operating condition before the valve 30 closes. The shroud 21 thereafter maintains a normalized temperature consistent with the new operating condition by normal heat conduction.

The foregoing described the operation of the invention when the turbine is throttled upwardly to meet an increased load or speed requirement. The reverse operation wherein the turbine is throttled downwardly to compensate for a reduced load or lower speed requirement will now be described.

Suppose the load on the turbine decreased or that it is desired to decrease its speed. The throttle control lever 67 (FIGURE 4) is moved in a leftward direction to decrease fuel delivery in a conventional manner which in turn lowers the temperature and pressure of the heated gas in the intake chamber 15. This leftward movement of the throttle control lever 67 simultaneously moves the control arm 64 to a position approximating that illustrated in FIGURE 7. The counterclockwise movement of the control arm 64 about its pivot 63 also moves correspondingly the cam element 73 because the fluid in the cylinder 69 resists upward movement of the piston 71 thereof.

The cam follower 62 is thus moved leftwardly, as before, by the action of the cam face 74 of the cam element 73 as illustrated in FIGURE 7. The leftward movement of the cam follower 62 in turn shifts the operating plunger 51 of the control valve 44 leftwardly from the second operating position to the first operating position. The land 53 of the plunger 51 closes the outlet or return means 59 and the land 52 moves out of registration with the port 55 and thereby communicates the source of fluid pressure in the pipe 56 to the upper chamber 42 of the actuating mechanism 36 through the control valve 44, pipe 43 and port 41 thus energizing the mechanism 36 to open the valve 30. The opening of the valve 30, as before, permits by-passing a portion of the heated gas from the intake chamber 15 through the annular passage 23 of the shroud 21 into the exhaust chamber 19 (FIGURE 1). The by-passing of the heated gas at a reduced temperature acts to lower at once the temperature of the shroud 21 correspondingly. The decrease in temperature in the annular passage of the shroud 21 contracts the channel elements 24 and 25 to deflect the wall 16' inwardly which decreases the inner diameter thereof. Since the decrease in temperature of the rotor 11 correspondingly decreases its diameter, the spatial clearance 27 between the rotor 11 and the internal face of the wall 16' remains substantially the same.

At the same time the decreased temperature of the heated gas in the intake chamber 15 acts on the fluid containing thermally responsive element 75 to retract progressively during an appreciable time period the fluid cylinder 69 which in turn rotates the cam element 73 in a clockwise direction to a position illustrated in FIGURE 8. The movement of the cam element 73 returns the control valve 44 to the second operating position illustrated in FIGURES 4 and 8 thereby de-energizing the mechanism 36 to close the valve 30. As before, the closing of the valve 30 terminates the by-pass of heated gas from the intake chamber 15 through the annular passage 23 of the shroud 21 to the exhaust chamber 19 as previously explained. Thus, as before, the delayed response of the thermal element permits gas from the intake chamber 15 to flow through the annular passage 23 of the shroud 21 for lowering the temperature thereof consistent with the lowered temperature in the intake chamber 15. Therefore, the shroud 21 contracts to meet the changed operating condition before the valve 30 again closes. The shroud 21 thereafter maintains a normalized temperature consistent with the changed operating condition by normal heat conduction.

Having thus described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:

1. For a heated gas propelled turbine having an intake chamber, an exhaust chamber, a driven rotor, a shroud having a toroidal shaped external jacket with an annular passage therethrough peripherally disposed about said rotor, a throttle control lever and a source of heated gas under pressure therefor, a device for thermally varying the internal diameter of said shroud to compensate for thermally induced changes in the diameter of said rotor comprising a plurality of circumferentially disposed conduits communicatively connecting said intake chamber with said annular passage, a pressure sensitive valve and actuating mechanism therefor positioned adjacent said exhaust chamber, said valve having an inlet port communicatively connected to said annular passage and an outlet port communicatively connected to said exhaust chamber, a source of air under pressure, a control valve, said control valve having a first port communicatively connected to said source of air under pressure, said control valve having a second port communicatively connected to said actuating mechanism of said pressure sensitive valve, said control valve having a discharge port, said control valve being provided with an operating plunger having a first operating position for communicating said second port with said first port for opening said pressure sensitive valve and a second operating position for communicatively connecting said second port with said discharge port for closing said pressure sensitive valve, a spring mounted in said control valve, said spring being positioned for urging said plunger toward said second operating position, a control arm pivotally mounted adjacent said control valve, one end portion of said arm being operatively connected to said throttle control lever, a fluid cylinder having a work member mounted on the other end portion of said arm, a cam element pivotally mounted on said arm, one end portion of said cam element being pivotally connected to said work member, the other end portion of said cam element being operatively engaged in abutting relation with said plunger, a fluid containing thermally responsive element positioned in said intake chamber, and a fluid conducting tube communicatively connecting said fluid containing thermally responsive element with said fluid cylinder whereby said plunger is shifted from said second operating position to said first operating position to open said pressure sensitive valve when said control arm with said cam element is moved rotatively for by-passing gas from said intake chamber through said annular passage of said shroud to said exhaust chamber and thereafter said thermally responsive element actuating said fluid cylinder progressively to move said cam element in a direction to shift said plunger from said first operating position to said second operating position to close said pressure sensitive valve for terminating said by-passing of gas from said intake chamber to said exhaust chamber through said annular passage of said shroud thereby maintaining the temperature of said shroud substantially the same as the temperature of said rotor.

2. For a heated gas propelled turbine having an intake chamber, an exhaust chamber, a driven rotor, a shroud having a toroidal shaped external jacket with an annular passage therethrough peripherally disposed about said rotor, a throttle control lever and a source of heated gas under pressure therefor, a device for thermally varying the internal diameter of said shroud to compensate for thermally induced changes in the diameter of said rotor comprising at least one conduit communicatively connecting said intake chamber with said annular passage, a pressure sensitive valve and actuating mechanism therefor positioned adjacent said exhaust chamber, said valve having an inlet port communicatively connected to said annular passage and an outlet port communicatively connected to said exhaust chamber, a source of air under pressure, a control valve, said control valve having a first port communicatively connected to said source of air under pressure, said control valve having a second port communicatively connected to said actuating mechanism of said pressure sensitive valve, said control valve having a discharge port and an operating plunger, said plunger having a first operating position for communicating said second port with said first port for opening said pressure sensitive valve and a second operating position for communicatively connecting said second port with said discharge port for closing said pressure sensitive valve, a resilient means mounted in said valve, said resilient means being positioned for urging said plunger toward said second operating position, a control arm pivotally mounted adjacent said control valve, one end portion of said arm being operatively connected to said throttle control lever, a fluid cylinder having a work member mounted on the other end portion of said arm, a cam element pivotally mounted on said arm, one end portion of said cam element being pivotally connected to said work member, the other end portion of said cam element being operatively engaged in abutting relation with said plunger, a fluid containing thermally responsive element positioned in said intake chamber, and a fluid conducting tube communicatively connecting said fluid containing thermally responsive element with said fluid cylinder whereby said plunger is shifted from said second operating position to said first operating position to open said pressure sensitive valve when said control arm with said cam element is moved rotatively for by-passing gas from said intake chamber through said annular passage of said shroud to said exhaust chamber and thereafter said thermally responsive element actuating said fluid cylinder progressively to move said cam element in a direction to shift said plunger from said first operating position to said second operating position to close said pressure sensitive valve for terminating said by-passing of gas from said intake chamber through said annular passage of said shroud to said exhaust chamber thereby maintaining the temperature of said shroud substantially the same as the temperature of said rotor.

3. For a heated gas propelled turbine having an intake chamber, an exhaust chamber, a driven rotor, a shroud having a toroidal shaped external jacket with an annular passage therethrough peripherally disposed about said rotor, a throttle control lever and a source of heated gas under pressure therefor, a device for thermally varying the internal diameter of said shroud to compensate for thermally induced changes in the diameter of said rotor comprising at least one first conduit communicatively connecting said intake chamber with said annular passage, a second conduit communicatively connecting said annular passage with said exhaust chamber, a pressure sensitive valve and actuating mechanism therefor, said valve being operatively interposed in said second conduit, a source of air under pressure, a control valve, said control valve having a first port communicatively connected to said source of air under pressure, said control valve having a second port communicatively connected to said actuating mechanism of said pressure sensitive valve, said control valve having a discharge port and an operating plunger, said plunger having a first operating position for communicating said second port with said first port for opening said pressure sensitive valve and a second operating position for communicatively connecting said second port with said discharge port for closing said pressure sensitive valve, a resilient means mounted in said valve positioned for urging said plunger toward said second operating position, a control arm pivotally mounted adjacent said control valve, one end portion of said arm being operatively connected to said throttle control lever, a fluid cylinder having a work member mounted on the other end portion of said arm, a cam element pivotally mounted on said arm, one end portion of said cam element being pivotally connected to said work member, the other end portion of said cam element being operatively engaged in abutting relation with said plunger, a fluid containing thermally responsive element positioned in one of said chambers, and a fluid conducting tube communicatively connecting said fluid containing thermally responsive element with said fluid cylinder whereby said plunger is shifted from said second operating position to said first operating position to open said pressure sensitive valve when said control arm with said cam element is moved rotatively for by-passing gas from said intake chamber through said annular passage of said shroud to said exhaust chamber and thereafter said thermally responsive element actuating said fluid cylinder progressively to move said cam element in a direction to shift said plunger from said first operating position to said second operating position to close said pressure sensitive valve for terminating said by-passing of gas from said intake chamber through said annular passage of said shroud to said exhaust chamber thereby maintaining the temperature of said shroud substantially the same as the temperature of said rotor.

4. For a heated gas propelled turbine having an intake chamber, an exhaust chamber, a driven rotor, a shroud having a toroidal shaped external jacket with an annular passage therethrough peripherally disposed about said rotor, a throttle control lever and a source of heated gas under pressure therefor, a device for thermally varying the internal diameter of said shroud to compensate for thermally induced changes in the diameter of said rotor comprising at least one first conduit communicatively connecting said intake chamber with said annular passage, a second conduit communicatively connecting said annular passage with said exhaust chamber, a pressure sensitive valve and actuating mechanism therefor, said valve being operatively interposed in said second conduit, a source of fluid under pressure and return means therefor for actuating said valve, a control valve, said control valve having a first port communicatively connected to said source of fluid under pressure and a second port communicatively connected to said actuating mechanism of said pressure sensitive valve, said control valve having a discharge port communicatively connected to said return means, said control valve having an operating element movable to a first position for communicating said second port with said first port for opening said pressure sensitive valve and a second position for communicatively connecting said second port with said discharge port for closing said pressure sensitive valve, yieldable means mounted on said turbine positioned for urging said operating element in one direction, a control arm pivotally mounted adjacent to said control valve, one end portion of said arm being operatively connected to said throttle control lever, a fluid cylinder having a work member mounted on the other end portion, cam means mounted on said arm positioned in operative relation with said operating element of said control valve, said work member of said fluid cylinder being operatively connected to said cam means, and a fluid containing thermally responsive element positioned in one of said chambers operatively connected to said fluid cylinder whereby said operating element of said control valve is moved from said second position to said first position when said control arm is moved for by-passing gas from said intake chamber through said annular passage of said shroud to said exhaust chamber and thereafter said thermally responsive element actuating said fluid cylinder progressively to move said cam means in a direction to shift said operating element of said control valve from said first position to said second position for terminating said by-passing of gas thereby maintaining the temperature of said shroud substantially the same as the temperature of said rotor.

5. For a heated gas propelled turbine having an intake chamber, an exhaust chamber, a driven rotor, a shroud having a toroidal shaped external jacket with an annular passage therethrough peripherally disposed about said rotor, a throttle control lever and a source of heated gas under pressure therefor, a device for thermally varying the internal diameter of said shroud to compensate for thermally induced changes in the diameter of said rotor comprising at least one first conduit communicatively connecting said intake chamber with said annular passage, a second conduit communicatively connecting said annular passage with said exhaust chamber, a pressure sensitive valve and actuating mechanism therefor operatively interposed in said second conduit, a source of fluid pressure and return means therefor for actuating said valve, a control valve having a first operating position for communicatively connecting said source of fluid pressure to energize said actuating mechanism for opening said pressure sensitive valve and a second position for de-energizing said actuating mechanism for closing said pressure sensitive valve, a control arm movably mounted in operative relation with said control valve and said throttle lever, a fluid cylinder having a work member mounted on said control arm, cam means mounted on said arm positioned in operative relation to said control valve, said work member of said fluid cylinder being operatively connected to said cam means, and a fluid containing thermally responsive element positioned in one of said chambers operatively connected to actaute said fluid cylinder whereby said control valve is moved from said second position to said first position when said control arm is moved for by-passing gas from said intake chamber through said annular passage of said shroud to said exhaust chamber and thereafter said thermally responsive element actuating said fluid cylinder progressively to move said cam means in a direction to move said control valve from said first position to said second position for terminating said by-passing of gas thereby maintaining the temperature of said shroud substantially the same as the temperature of said rotor.

6. For a heated gas propelled turbine having an intake chamber, an exhaust chamber, a driven rotor, a shroud having a toroidal shaped external jacket with an annular passage therethrough peripherally disposed about said rotor, a throttle control lever and a source of heated gas under pressure therefor, a device for thermally varying the internal diameter of said shroud to compensate for thermally induced changes in the diameter of said rotor comprising at least one first conduit communicatively connecting said intake chamber with said annular passage, a second conduit communicatively connecting said annular passage with said exhaust chamber, a pressure sensitive valve and actuating means therefor operatively interposed in said second conduit, a source of fluid under pressure and return means therefor for actuating said valve, a control valve having a first position for communicatively connecting said source of fluid pressure to energize said actuating mechanism for opening said pressure sensitive valve and a second position for de-energizing said actuating mechanism for closing said pressure sensitive valve, a control arm positioned in operative relation with said control valve and said throttle control lever, a fluid cylinder having a work member mounted on said arm positioned in operative relation with said control valve, and a fluid containing thermally responsive element positioned in one of said chambers operatively connected to actuate said fluid cylinder whereby said control valve is moved from said second position to said first position when said throttle control and said arm are moved for by-passing gas from said intake chamber through said annular passage of said shroud to said exhaust chamber and thereafter said fluid cylinder being actuated by said thermal responsive element in a direction to move progressively said control valve from said first position to said second position for terminating said by-passing of gas thereby maintaining the temperature of said shroud substantially the same as the temperature of said rotor.

7. For a heated gas propelled turbine having an intake chamber, an exhaust chamber, a driven rotor, a shroud having a toroidal shaped external jacket with an annular passage therethrough peripherally disposed about said rotor, a throttle control lever and a source of heated gas under pressure therefor, a device for thermally varying the internal diameter of said shroud to compensate for thermally induced changes in the diameter of said rotor comprising a first conduit communicatively connecting said intake chamber with said annular passage, a second conduit communicatively connecting said annular passage with said exhaust chamber, a pressure sensitive valve and actuating means therefor operatively interposed in one of said conduits, a source of fluid under pressure and return means therefor for actuating said valve, a control valve having a first position for communicatively connecting said source of fluid pressure to energize said actuating mechanism for opening said pressure sensitive valve and a second position for de-energizing said actuating mechanism for closing said pressure sensitive valve, a control arm positioned in operative relation with said control valve and said lever, a fluid cylinder having a work member mounted on said arm positioned in operative relation with said control valve, and a fluid containing thermally responsive element positioned in one of said chambers operatively connected to actuate said fluid cylinder whereby said control valve is moved from said second position to said first position when said lever and said arm are moved for by-passing gas through said annular passage of said shroud to said exhaust chamber and thereafter said fluid cylinder being actuated by said thermal responsive element in a direction to move progressively said control valve from said first position to said second position for terminating said by-passing of gas thereby maintaining the temperature of said shroud substantially the same as the temperature of said rotor.

8. For a heated gas propelled turbine having an intake chamber, an exhaust chamber, a driven rotor, a shroud having a toroidal shaped external jacket with an annular passage therethrough peripherally disposed about said rotor, a throttle control lever and a source of heated gas under pressure therefor, a device for thermally varying the internal diameter of said shroud to compensate for thermally induced changes in the diameter of said rotor comprising a first conduit communicatively connecting said intake chamber with said annular passage, a second conduit communicatively connecting said annular passage with said exhaust chamber, a pressure sensitive valve and actuating means therefor operatively interposed in one of said conduits, a source of fluid under pressure and return means therefor for actuating said valve, a control valve having a first position for communicatively connecting said source of fluid pressure to energize said actuating means for opening said pressure sensitive valve and a second position for de-energizing said actuating mechanism for closing said pressure sensitive valve, a fluid cylinder having a work member mounted in operative relation with said lever and said control valve, and a fluid containing thermally responsive element positioned in one of said chambers operatively connected to actuate said fluid cylinder whereby said control valve is moved from said second position to said first position when said lever is moved for by-passing gas through said annular passage of said shroud to said exhaust chamber and thereafter said fluid cylinder being actuated by said thermal responsive element in a direction to move progressively said control valve from said first position to said second position for terminating said by-passing of gas thereby maintaining the temperature of said shroud substantially the same as the temperature of said rotor.

9. For a heated gas propelled turbine having an intake chamber, an exhaust chamber, a driven rotor, a shroud having a toroidal shaped external jacket with an annular passage therethrough peripherally disposed about said rotor, a throttle control lever and a source of heated gas under pressure therefor, a device for thermally varying the internal diameter of said shroud to compensate for thermally induced changes in the diameter of said rotor comprising a first conduit communicatively connecting said intake chamber with said annular passage, a second conduit communicatively connecting said annular passage with said exhaust chamber, valve means operatively interposed in one of said conduits, a fluid cylinder having a work member mounted in operative relation with said valve means and said lever, and a fluid containing thermally responsive element positioned in one of said chambers operatively connected to actuate said fluid cylinder whereby said valve means is moved from a closed position to an open position when said lever is moved for by-passing gas through said annular passage of said shroud to said exhaust chamber and thereafter said fluid cylinder being actuated by said thermal responsive element in a direction to close progressively said valve means for terminating said by-passing of gas thereby maintaining the temperature of said shroud substantially the same as said rotor.

10. For a heated gas propelled turbine having an intake chamber, an exhaust chamber, a driven rotor, a shroud having a toroidal shaped external jacket with an annular passage therethrough peripherally disposed about said rotor, a throttle control lever and a source of heated gas under pressure therefor, a device for thermally varying the internal diameter of said shroud to compensate for thermally induced changes in the diameter of said rotor comprising conduit means for communicatively connecting at least one of said chambers with said annular passage, valve means interposed in said conduit means and positioned in operative relation with said lever, a fluid cylinder having a work member mounted in operative relation with said valve means, and a fluid containing thermally responsive element positioned in one of said chambers operatively connected to actuate said fluid cylinder whereby said valve means is moved from a closed position to an open position when said lever is moved for bypassing gas through said annular passage of said shroud and thereafter said fluid cylinder being actuated by said thermal responsive element in a direction to close progressively said valve means for terminating said by-passing of gas thereby maintaining the temperature of said shroud substantially the same as said rotor.

References Cited in the file of this patent

UNITED STATES PATENTS

| | | |
|---|---|---|
| 899,319 | Parsons et al. | Sept. 22, 1908 |
| 990,781 | Ross | Apr. 25, 1911 |
| 2,297,852 | Zetterquist | Oct. 6, 1942 |
| 2,494,178 | Imbert | Jan. 10, 1950 |
| 2,787,440 | Thompson | Apr. 2, 1957 |
| 2,896,906 | Durkin | July 28, 1959 |

FOREIGN PATENTS

| | | |
|---|---|---|
| 301,298 | Great Britain | May 3, 1929 |
| 698,898 | Great Britain | Oct. 28, 1953 |
| 791,568 | Great Britain | Mar. 5, 1958 |